Aug. 1, 1950 J. A. FALER 2,516,968
FILTER-CONVEYER FOR SOLVENT EXTRACTORS
Filed Sept. 4, 1946 4 Sheets-Sheet 1
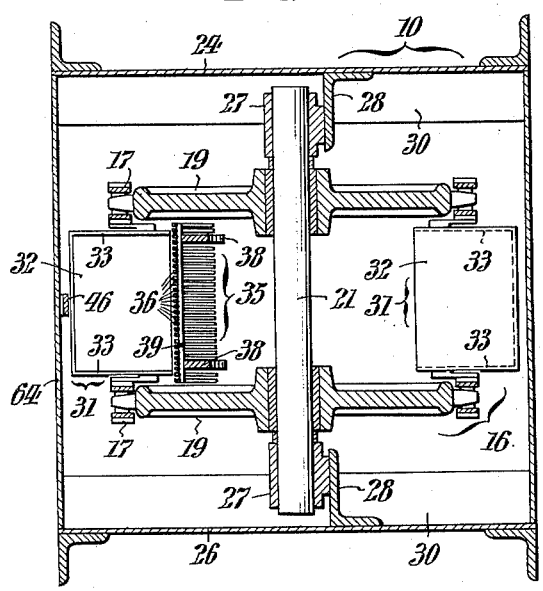
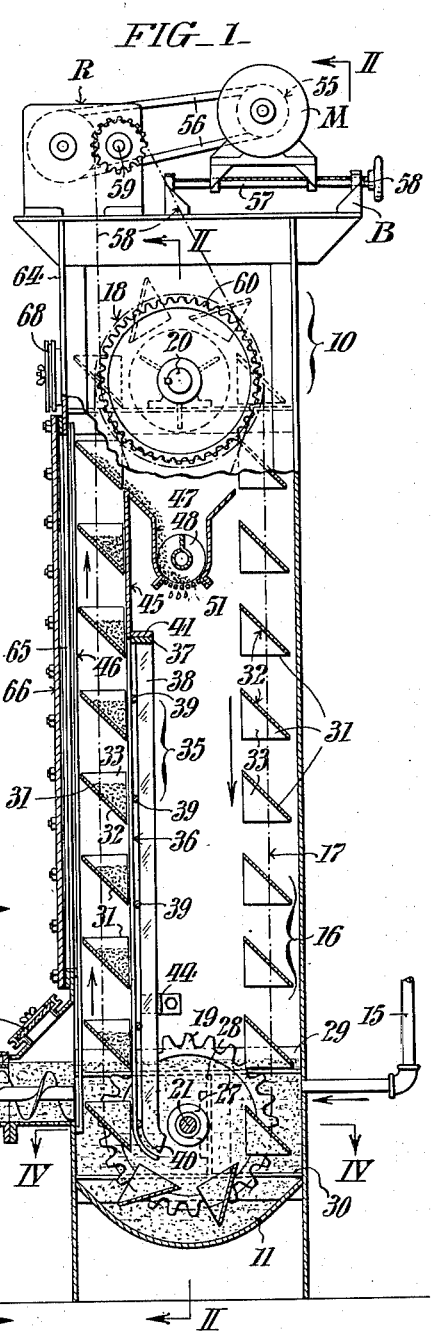
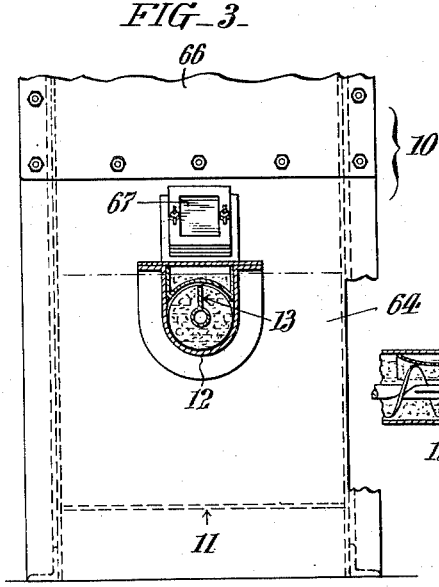
WITNESSES
INVENTOR:
John A. Faler,
BY
ATTORNEYS.

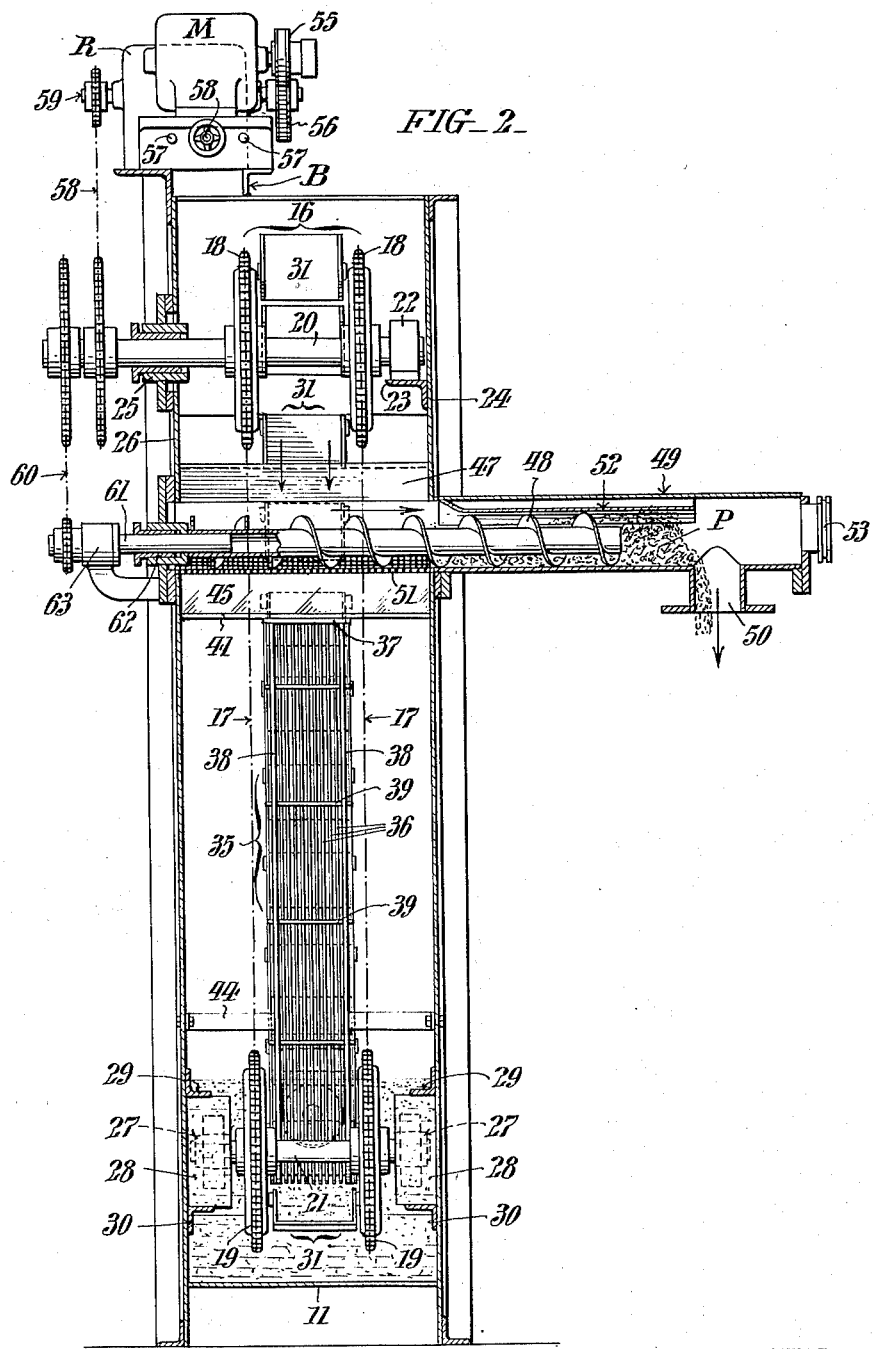

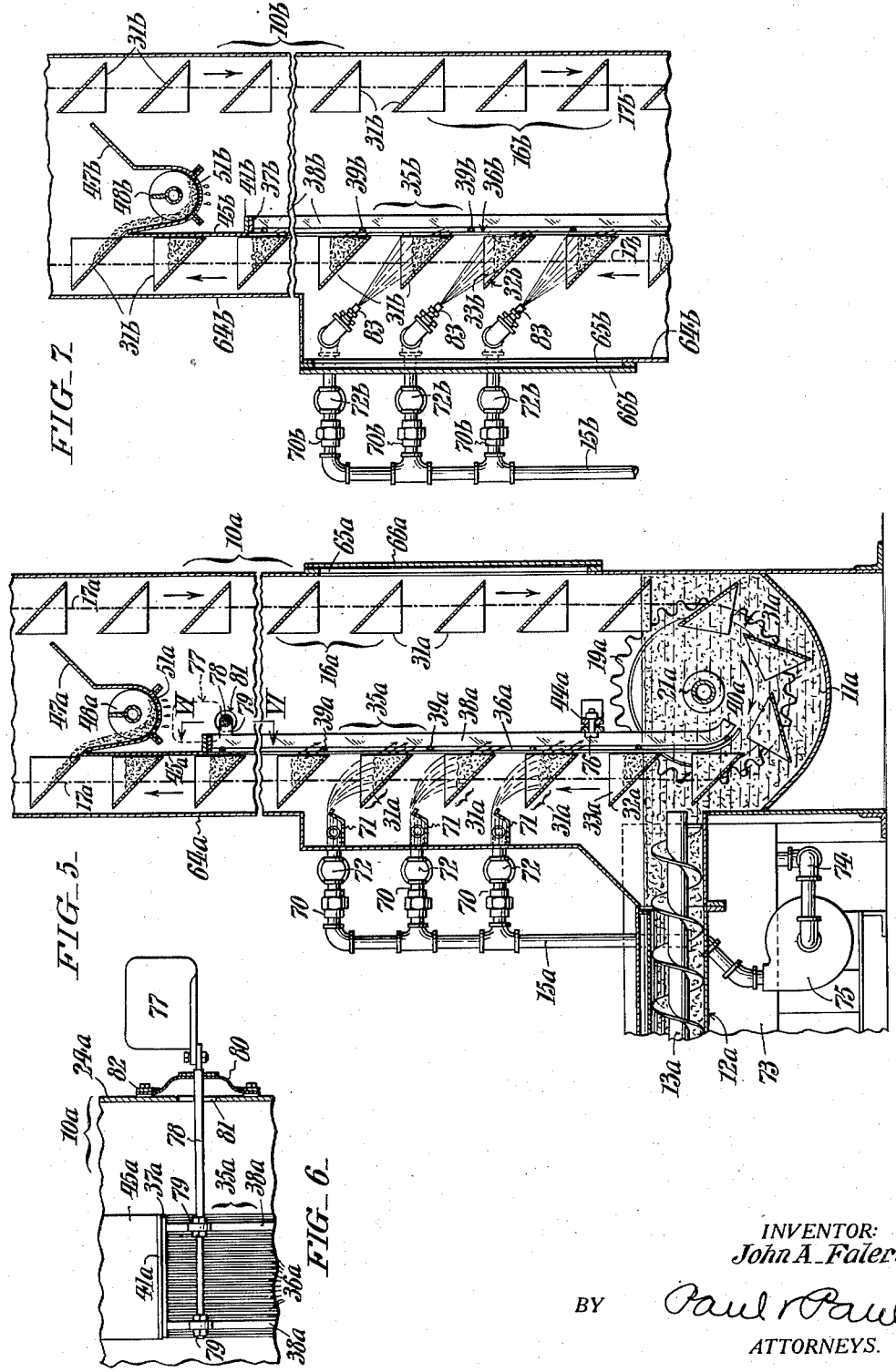

Aug. 1, 1950 J. A. FALER 2,516,968
FILTER-CONVEYER FOR SOLVENT EXTRACTORS
Filed Sept. 4, 1946 4 Sheets-Sheet 4
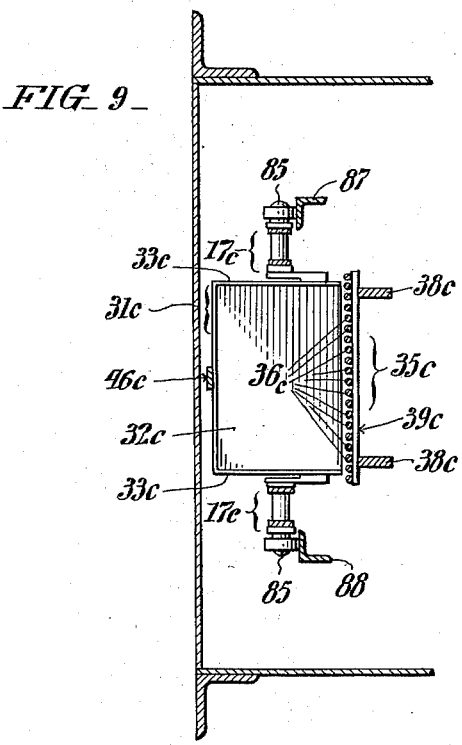
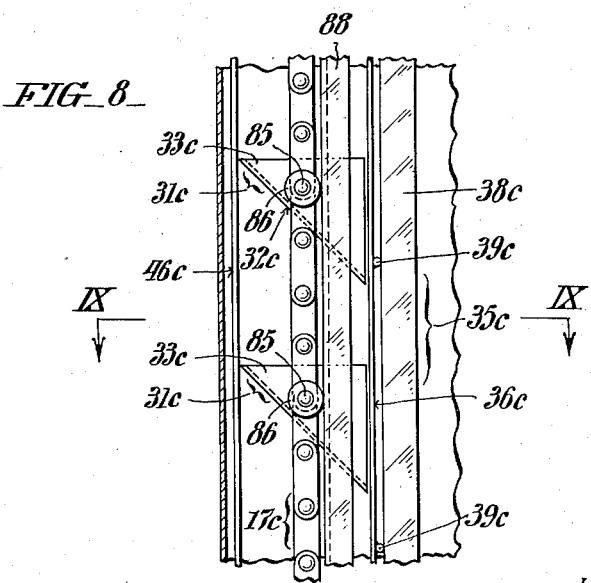
WITNESSES
Hubert Fuchs
George L. Comly
INVENTOR:
John A. Faler,
BY Paul & Paul
ATTORNEYS.

Patented Aug. 1, 1950

2,516,968

UNITED STATES PATENT OFFICE 2,516,968

FILTER-CONVEYER FOR SOLVENT EXTRACTORS

John A. Faler, Farmington, Mich., assignor to Detrex Corporation, Detroit, Mich., a corporation of Michigan Application September 4, 1946, Serial No. 694,799

21 Claims. (Cl. 23—270)

This invention relates to elevators. More specifically it is concerned with elevator structures useful in connection with extraction apparatus generally of the type disclosed in U. S. Patent 2,377,135 granted to Clarence F. Dinley and William L. McCracken on May 29, 1945, for extracting oils, fats or other valuable substances from flaked, crushed or otherwise comminuted materials such for example as soya beans, cotton seeds, corn germs, milk-weed seeds, sun-flower seeds, linseed, mustard seeds, nuts of various kinds, copra, meat scraps including offal, crisp cake and liver meal. In this patented apparatus, the material is progressed along a closed horizontal extraction channel or trough by a screw conveyer with the particles free to move about in solvent liquid flowed counterwise, and after having traversed said channel or trough, is removed by another screw conveyer in a relatively long upwardly sloping lift tube and thereby elevated for delivery to a further processing means in the form of a drier. While this lift tube and conveyer arrangement has proved perfectly efficient and satisfactory in operation as a means for removing the material after extraction, it restricted drainage of the solvent from the material during its elevation. Moreover, the use thereof is prohibitive in installations where sufficient space is lacking for its accommodation.

My invention has for one of its aims to overcome the foregoing drawbacks. This objective is realized in practice, as hereinafter more fully disclosed, through provision of a relatively simple vertical elevator structure in which an endless belt scoop conveyer is enclosed in a vaportight housing having a sump in its bottom in direct communication with the treating channel or trough of the extractor, and in which is incorporated means permitting effective drainage of the material to take place as it is continually elevated from the sump after having undergone extraction, to a receiving means in the top of the housing wherein an auxiliary conveyer operates to continually discharge the material through a tube extending laterally from the housing, with maintenance in said tube of a seal to prevent escape of solvent vapors.

Other objects and attendant advantages will appear in the following detailed description of the attached drawings, wherein Fig. 1 is a broken out fragmentary view partly in side elevation and partly in section of an elevator structure conveniently embodying my invention, together with the adjacent portion of the treating channel or trough of the extraction apparatus.

Fig. 2 is a cross section taken as indicated by the angled arrows II—II in Fig. 1.

Fig. 3 is a fragmentary view in vertical section taken as indicated by the angled arrows III—III in Fig. 1.

Fig. 4 is a horizontal section taken as indicated by the angled arrows IV—IV in Fig. 1.

Fig. 5 is a fragmentary view generally like Fig. 1 showing a modified embodiment.

Fig. 6 is a fragmentary view in section taken as indicated by the angled arrows VI—VI in Fig. 5.

Fig. 7 is a fragmentary view also generally like Fig. 1 showing another alternative construction.

Fig. 8 is a fragmentary view also like Fig. 1 showing a further modification; and Fig. 9 is a horizontal section taken as indicated by the angled arrows IX—IX in Fig. 8.

With reference first more particularly to Figs. 1-4 of these illustrations, my improved elevator structure, in the form there shown, comprises an upright, vapor-tight housing 10 which may be of metal with a sump 11 in the lower portion thereof. Connecting into one side of the housing 10 is the horizontal covered treating trough 12 of an extraction apparatus like that shown in the Dinley et al. patent hereinbefore mentioned. The divided material to be processed is continually introduced into the far end (not shown) of the trough 12 and the particles or flakes are continually advanced rightward by a rotary feed screw 13, while free to move about in the solvent in the same manner as disclosed in the reference, the contaminated solvent or miscella being continually withdrawn through a strainer or filter (not shown) at said far end of the trough with maintenance of the liquid level always just slightly above the top of the screw thread as indicated. According to my invention, fresh solvent is continually introduced into the sump 11 through a pipe 15 leading from a suitable source of supply, not illustrated. For the purpose of continually removing treated solid material from the sump 11, there is within the housing 10 a lift conveyer 16 of the endless belt type which moves as indicated by the arrows in Fig. 1, and which consists of a pair of laterally spaced chains 17 (see Fig. 4) which are trained about sprockets 18 and 19 on vertically spaced shafts 20 and 21. The upper sprocket shaft 20 is journaled at one end in a bearing 22 (Fig. 2) affixed to a cross member 23 of the housing framework adjacent the rear wall 24 (Fig. 2), its other end extending out through a stuffing box bearing 25 secured to the front wall 26. The lower sprocket shaft 21 is journaled in bearings 27 supported, with capacity for up and down adjustment, by relatively short angles 28 extending between a pair of vertically spaced cross members 29 and 30 secured to the inner faces of the front and rear walls 26 and 24 of the housing near the bottom. Through such adjustment it is possible to compensate for wear of the sprocket chains 17 from time to time and thereby keep them taut. Hung crosswise between the chains 17 at intervals are scoops 31 which, in rounding the lower sprockets 19, gather up suspended solid material from the liquid in the sump 11 as shown in Fig. 1. The scoops 31, it will be noted, have sloping front walls 32 and closed ends 33 but are open at the back, the inclination of the front walls being downward and inward of the upward moving run of the conveyer 16 at the left of Fig. 1. Disposed adjacent the upward run of the conveyer 16 is a stationary filter screen 35 having laterally-spaced vertical rods 36 against which the bottom edges of the scoop fronts 32 and the rear edges of the scoop ends 33 slidingly bear as they rise from the liquid in the sump 11, the spacing of said rods being such as to prevent passage of the material particles between them while permitting the excess solvent to drain from the material in the scoops back into the sump. As best shown in Fig. 2, the screen 35 has a frame with top and side bars 37 and 38 and a number of suitably spaced horizontally arranged intermediate bars 39 which are all welded or otherwise permanently secured together and by which the rods 36 are rigidly supported. At their bottom ends the rods 36 and the side bars 38 of the filter frame are rounded, as at 40, substantially in concentric relation to the axis of the lower sprocket shaft 21 so as to be clear of the path of the conveyer buckets 31. The filter screen 35 extends partway of the height of the housing 10, being supported at the top from a cross piece 41 disposed transversely between the front and rear walls 26 and 24 of said housing, and near the bottom by brackets 44 reaching inward from said walls. Immediately above the filter 35 and lying in the plane of the rods 36 is a crosswise-extending plate 45 which affords a smooth surface against which the backs of the conveyer scoops 31 slidingly bear in their further rise, and which thus serves as a guard to prevent loss of the material temporarily from said scoops. A fixed vertical guide rail 46 within the housing 10 with which the top edges of the scoop fronts 32 contact, insures positive engagement of the backs of the scoops 31 with both the screen rods 36 and the guard plate 45.

Immediately below the upper chain sprockets 18 is a hopper 47 of which one side wall meets with the top edge of the guard plate 45. As the conveyer scoops 31 rise above the top edge of the guard plate 45, the material, by reason of the slope of the scoop fronts 32, is spilled into the hopper 47 as clearly shown in Fig. 1.

A continuously operating auxiliary rotary screw conveyer 48 in the bottom of the hopper 47 removes the material as fast as it is received and discharges it laterally from the housing 10 through a delivery tube 49 (Fig. 2) which has a downward outlet 50 for connection to other apparatus such, for example, as a drier (not shown) for further processing the material. Within the confines of the housing 10, the bottom of the hopper 47 is perforated or provided with a reticulate screen inset as conventionally indicated at 51 to permit further drainage of excess liquid which may have been carried along with the material, the hopper bottom and the screening being also conformative with the thread of the conveyer screw 48 so as to be continually wiped thereby and thus kept clean.

As shown, the screw conveyer 48 terminates short of the outlet 50 of the tube 49 to determine the formation and maintenance immediately therebeyond in said tube, of a plug of the material as at P in Fig. 2 to serve as a seal to preclude escape of solvent vapors in either direction. In this function the screw 48 is assisted by an arching shroud 52 which contacts with the screw threads at the top, and which also aids in insuring forward progression of the material in the delivery tube 49. In order that the attendant of the apparatus may check on the action of the screw conveyer 48 in its plugging function from time to time, a sight glass 53 has been applied over the outer end of the delivery tube 49.

At the top of housing 10 is an electric motor M which transmits power through a V-belt connection 56 to the input shaft of a speed reducing unit R. The belt pulley 55 on the shaft of the motor M is of the regulatable type, such as a "Reeves variable speed pulley"; and said motor is slidably mounted for adjustment along guide rods 57 on a fixed base B to enable changing of the belt centers for increase or decrease in speed. Such adjustment of the motor M is effected by means of a threaded spindle 58 in the base B having a hand wheel at one end as shown in Figs. 1 and 2. By means of a sprocket chain connection 58, motion is in turn transmitted, at reduced speed, from the output shaft 59 of the unit R to the shaft 20 of the upper sprockets 18 of the elevating conveyer chains 17. Through still another chain connection 60, motion is communicated at the proper speed from the sprocket shaft 20 to the delivery conveyer screw 48 whereof the shaft 61 extends outward through a stuffing box bearing 62 in the front wall 26 of the housing 10, and receives further rotative support in an outboard bearing 63.

For convenience of access to the moving parts within the housing 10, when desired or necessary, the latter is provided in its side wall 64 with an opening 65 which is normally closed by a removable panel 66. Through glazed sight openings 67 and 68 in the side wall 64 respectively below and above the panel 66, it is possible to observe the functioning of the lift conveyer 16 in the regions of scoop loading and discharging.

*Operation*

As the scoops 31 emerge from the liquid in the sump 11, they carry along quantities of soaked extract material. Since the finer particles of the material float at the top of the liquid in the sump 11 and the coarser particles are submerged, the coarser particles will be caught in the lower portions of the scoops 31, and the finer particles in the upper portions of the scoop as the latter rise in the liquid. As a result, the coarse material will tend to support the finer material and prevent it from passing through the screen 35 after the scoops are elevated from the liquid, and moreover act as a filter for the finer particles. The movement of the lift conveyer being relatively slow, ample time is afforded for draining of most of the liquid from the material in the scoops before the latter reach the guard plate 45. Throughout their rise, the scoops 31 are maintained in direct contact with the bars 36 of the screen by the action of the guide rail 46 to prevent escape of any of the material from them, the interstices between the screen bars being kept from clogging by reason of the wiping action of said scoops. Upon elevation of the scoops above the guard plate 45, the material discharges from them by gravity into the hopper 47, the discharge being facilitated by the slope of the scoop fronts 32. As the material drops into the hopper 47, it is immediately picked up by the auxiliary conveyer 48 and advanced into the delivery tube 49 for ultimate discharge therefrom through the outlet 50 for example into a direct-connected drier, not shown. During progression in the hopper 47, opportunity is afforded for drainage of any liquid which may still have been retained in the material as the latter passes over the screen 51 in the hopper bottom. Thus by the time the material has passed through the delivery tube 49, it is fairly dry. As hereinbefore explained a plug P of the material is constantly maintained in the tube 49 immediately ahead of the outlet 50 to prevent hot vapors from the drier from entering the elevator housing. The lift conveyer 16 and the auxiliary delivery screw conveyer 48 are continually driven through the chain connections 58 and 60 from the speed reducer R, powered by the single electric motor M. This drive arrangement is obviously advantageous by virtue of its simplicity. In practice the speed of the two chain connections 58 and 60 is so coordinated with that of the feed screw 13 of the extractor, the rate of input of the raw material into the extractor channel or trough 12, and the rate of solvent supply to the sump 11, that the processing is carried out smoothly and effectively with assurance of a maximum yield of the extract. It is to be particularly noted that the scoops 31, by virtue of their novel construction and arrangement as hereinbefore described, in entering and passing through the liquid in the sump 11 cause very little agitation. This is highly advantageous in practice since it does not unduly disturb the floating fines which latter are therefore readily picked up and deposited upon the coarser material gathered up by the scoops in the bottom of the sump 11. The scoops of my invention are moreover advantageous in that they permit the conveyer to be run at much lower speeds without impairment of their capacity to properly discharge their contents into the hopper 47 than would be possible with the ordinary or conventional type of conveyer buckets.

In the modification illustrated in Figs. 5 and 6, fresh solvent is conducted into the lower part of the casing 10a by way of a pipe 15a having a plurality of branches 70 which respectively discharge into small weir troughs 71 attached at different levels to the inner face of the side wall 64a. The overflow from the weir troughs 71 spills into the filled conveyer scoops 31a at the rising side of the lift conveyer 16a and thereby affects a final leaching of any residual oil or fat contained in the material after it is taken from the sump 11a and before it is filtered by the screen 35a as its elevation continues. As shown, the pipe branches 70 are provided with individual valves 72 for controlling liquid flow into the weir troughs 71. The fresh solvent is taken from a supply tank 73 beneath the treating trough 12a through a drain pipe 74 and delivered to the pipe 15a by a rotary metering pump 75. As a further improvement, the filter screen 35a is in this instance pivotally supported centrally near its bottom by a bolt 76 fixed in a bar 44a which extends crosswise between the front and rear walls of the housing 10a. As a means for oscillating the screen 35a above the pivot 76, I have shown at 77 in Fig. 6, an electric vibrator which may be of any well known commercial type, and which is connected to the outer end of a shaft or rod 78 whereof the inner end is rigidly secured to the side bars 38a of the filter frame near the top as at 79. The shaft or rod 78, it will be further noted from Fig. 6, passes with a tight fit through a resilient diaphragm 80 which is secured over a clearance opening 81 in the side wall 64a of the housing 10a by means of a clamp ring 82 to prevent escape of solvent vapors at that region.

In the alternative embodiment shown in Fig. 7, the branches 70b of the pipe 15b are provided, within the housing 10b, with terminal nozzles 83 which are angularly directed downward so as to spray the clean solvent into the loaded upwardly-traveling conveyer scoops 31b. The nozzles 83 may be reached for the purposes of adjustment or cleaning upon removal of a panel 66b that covers an access opening 65b in the side wall 64b of the housing 10b. In all other respects the construction here is identical with that of Figs. 5 and 6.

The two modifications just described are especially suited for operation with materials which are coarse and do not readily break up into fines during extraction. As the fresh solvent is applied to the material in the scoops of the lift conveyer in either instance, the residual contaminated solvent on the surface of the material is effectively displaced. The liquid in the sump, although replenished by continually introduced fresh solvent, nevertheless contains traces of the extract. Thus treatment of the material in the scoops with fresh solvent during elevation favors the attainment of a maximum yield of the extract before the material is discharged from the elevator.

In order to prevent the conveyor scoops from scraping against and thereby wearing away the screen, I resort in actual practice to the construction shown in Figs. 8 and 9. Here it will be observed that the pins of the conveyer chains 17c are extended outwardly as at 85 and provided individually with rollers 86 for engaging fixed vertically-arranged guide track rails 87 and 88 respectively. These rails 87 and 88 are so positioned as to determine a spacing of a few thousandths of an inch between the bottom edges of the scoops 31c and the front face of the screen 35c and so preclude direct contact and wear between the former and the latter.

Having thus described my invention, I claim:

1. An elevator structure of the character described including a sump for reception of liquid carrying divided solid material; an endless belt lift conveyer trained about vertically-spaced wheels and provided with a series of scoops with front and end walls and open backs which, in rounding the lower guide wheel, gather up divided material from the liquid in the sump; a vertically-arranged filter screen along the upwardly moving run of the conveyer slidingly engaged by the backs of the filled rising scoops to assist in retaining the materials in the scoops while permitting draining of residual liquid from the material during its elevation; and a receiver at the top of the conveyer for receiving the filtered material from the scoops.

2. An elevator structure according to claim 1, wherein the filter screen is composed of multiple upright bars spaced by intervals of a width to preclude passage of the solid particles between them.

3. An elevator structure according to claim 1, further including a vertical guide surface arranged to be slidingly contacted by the fronts of the scoops for maintaining the latter in engagement with the filter screen.

4. An elevator structure according to claim 1, wherein the front walls of the scoops are sloped so that in the upward run of the conveyer they incline downwardly toward the screen and thus facilitate liquid drainage from the material during its elevation as well as discharge of the material subsequently into the receiver.

5. An elevator structure according to claim 1, wherein the lift conveyer comprises two laterally-spaced chains; wherein the wheels are in the form of sprockets; and wherein the scoops are supported crosswise between the chains.

6. An elevating structure according to claim 1, wherein the screen extends from the sump part way up the rising run of the conveyer; wherein an imperforate guard surface extends above the screen in the plane thereof wherewith the scoops slidingly engage to insure retainment of the material in its further elevation; and wherein the receiver is in the form of a hopper into which the scoops spill their contents as they rise above said surface.

7. An elevator structure according to claim 1, wherein the conveyer is enclosed in an air-tight upright housing having an access opening in one of its side walls, and a removable panel closing said opening.

8. An elevator structure according to claim 1, wherein the conveyer is enclosed in an upright air-tight housing having glazed sight openings adjacent the top and bottom thereof in one of its walls through which the pick-up and discharging functions of the conveyor scoops can be observed.

9. An elevator structure according to claim 1, wherein the lift conveyor is enclosed in an air-tight housing; wherein the receiver is in the form of a hopper with a delivery tube extending laterally outward therefrom through one side of the housing; and wherein an auxiliary conveyer operates to continually advance the material from said hopper into said tube.

10. An elevator structure according to claim 1, wherein the lift conveyer is enclosed in an air-tight housing; wherein the receiver is in the form of a hopper with a delivery tube extending laterally therefrom through one side of the housing, said tube having a downward outlet at its outer end; wherein an auxiliary conveyer advances the material from the hopper into the tube; and wherein said auxiliary conveyer extends into the tube but terminates short of its outlet to determine formation and maintenance immediately in advance of the latter, of a plug of the material to serve as a seal against escape of solvent vapors from the housing.

11. An elevator structure according to claim 1, wherein the lift conveyer is enclosed in an air-tight housing; wherein the receiver is in the form of a hopper with a discharge tube extending laterally therefrom; wherein an auxiliary rotary screw conveyer operates to advance the material from the hopper into the tube; and wherein a portion of the hopper bottom is reticulate and contacts conformatively with the threads of the screw to permit further drainage of excess liquid from the material back into the sump.

12. An elevator structure according to claim 1, wherein the lift conveyor comprises two laterally-spaced chains; wherein the chain wheels are in the form of sprockets; wherein the scoops are supported crosswise between the chains; and further including a motor supported at the top of the housing and operatively connected to the shaft of the upper chain wheels.

13. An elevator structure according to claim 1, wherein the conveyer is enclosed in an air-tight housing; wherein the lift conveyer comprises two laterally-spaced chains; wherein the chain wheels are in the form of sprockets; wherein the receiver is in the form of a hopper with a discharge tube extending outwardly through one side of the housing; wherein an auxiliary rotary conveyer screw operates to advance the material from the hopper through said tube; and further including a motor at the top of the housing operatively connected to the shaft of the upper sprocket wheels and also to the rotary screw conveyer in the receiving hopper.

14. An elevator structure according to claim 1, wherein the screen is supported by a fixed pivot for edgewise oscillation in its own plane; and further including means for vibrating it about its pivot.

15. An elevator structure according to claim 1, wherein the lift elevator is enclosed in an air-tight housing; wherein the screen is supported by a fixed pivot for edgewise oscillation in its own plane; and further including an externally disposed vibrator with a rod connection extending, with a tight fit, through a diaphragm in a wall of the housing to the screen.

16. An elevator structure according to claim 1, further including an auxiliary conveyer for disposing of the material elevated by the lift conveyer; gear means connecting the two conveyers for operation at a fixed ratio; and regulatable drive means for the gearing.

17. An elevator structure according to claim 1, further including an auxiliary conveyer for disposing of the material elevated by the lift conveyer; gear means connecting the two conveyers for operation at a fixed ratio; a speed reduction unit from which the gear means derives its motion; and regulatable drive means for said speed reduction unit.

18. An elevator structure according to claim 1, further including a conduit constructed and arranged to supply fresh liquid for discharge into the scoops immediately upon emergence of the latter from the liquid in the sump.

19. An elevator structure according to claim 1, further including a conduit for conduction of fresh liquid; and a wier above the liquid level in the sump receiving the fresh liquid from the conduit and from which the fresh liquid is spilled into the scoops as they emerge from the liquid in the sump.

20. An elevator structure according to claim 1, further including a conduit for conduction of fresh liquid; said conduit having a nozzle for discharging the fresh liquid into the scoops as they emerge from the liquid in the sump.

21. An elevator structure of the character described including a sump for reception of liquid carrying divided solid material; an endless lift chain conveyer trained about vertically-spaced wheels and provided with a series of scoops with open backs, closed ends and inclined fronts, which, as the conveyer rounds the lower wheels, gather up divided material from the liquid in the sump; a vertically-arranged filter screen along the upwardly removing run of the conveyer facing the open backs of the filled rising scoops and permitting the residual liquid to drain from the material during its elevation; and a guide surface coacting with the conveyer chain to prevent direct contact of the contiguous rear edges of the scoop sides and the bottom edges of the scoop fronts with the screen.

JOHN A. FALER.

REFERENCES CITED

The following references are of record in the file of this patent:

UNITED STATES PATENTS

| Number | Name | Date |
|---|---|---|
| 550,033 | Wheeler | Nov. 19, 1895 |
| 2,225,799 | Robinson | Dec. 24, 1940 |
| 2,227,605 | Swallen | Jan. 7, 1941 |
| 2,451,081 | Ford | Oct. 12, 1948 |

FOREIGN PATENTS

| Number | Country | Date |
|---|---|---|
| 569,242 | France | Oct. 12, 1922 |